United States Patent [19]

Haneda et al.

[11] Patent Number: 5,140,411
[45] Date of Patent: Aug. 18, 1992

[54] IMAGE READING APPARATUS CAPABLE OF DISCRIMINATING BETWEEN A CHROMATIC AND AN ACHROMATIC PORTION OF AN IMAGE

[75] Inventors: Satoshi Haneda; Masakazu Fukuchi, both of Hachioji; Seiko Naganuma, Kokubunji; Masahiko Itaya, Akishima; Shunji Matsuo, Hino; Shizuo Morita, Tachikawa, all of Japan

[73] Assignee: Konica Corporation, Tokyo, Japan

[21] Appl. No.: 501,927

[22] Filed: Mar. 30, 1990

[30] Foreign Application Priority Data

Apr. 6, 1989 [JP] Japan .................................. 1-89095

[51] Int. Cl.⁵ .............................................. H04N 1/46
[52] U.S. Cl. ...................................... 358/75; 358/80; 358/113
[58] Field of Search ....................... 358/22, 75, 78, 80, 358/113; 382/17

[56] References Cited

U.S. PATENT DOCUMENTS

| | | | |
|---|---|---|---|
| 4,724,354 | 2/1988 | Dill | 358/113 |
| 4,812,899 | 3/1989 | Kueppers | 358/78 |
| 4,878,113 | 10/1989 | Nakamura | 358/113 |
| 4,887,150 | 12/1989 | Chiba et al. | 358/80 |
| 4,893,177 | 1/1990 | Tada et al. | 358/75 |
| 4,951,133 | 8/1990 | Onoda | 358/113 |
| 4,965,663 | 10/1990 | Sasaki | 358/75 |

Primary Examiner—Jose Couso
Attorney, Agent, or Firm—Finnegan, Henderson, Farabow, Garrett and Dunner

[57] ABSTRACT

A color image reader for discriminating a color component of a light image, comprising a first photoelectric transfer device for transferring visible range light to an electric signal, a second photoelectric transfer device for transferring infrared range light to another electric signal, and a discriminator for discriminating between a chromatic portion of the light image and an achromatic portion of the light image according to the two different electric signals.

8 Claims, 10 Drawing Sheets

FIG. 3
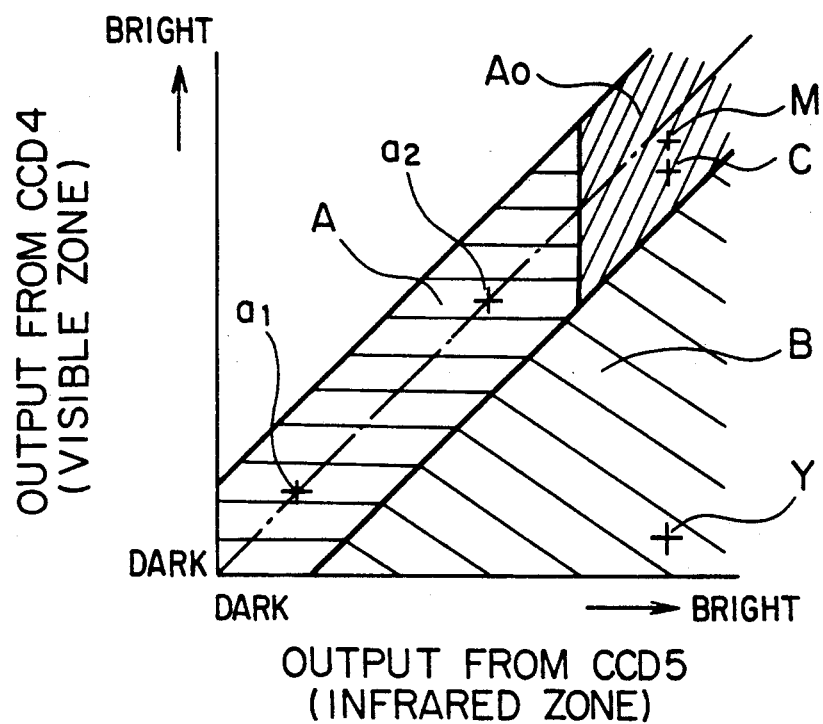
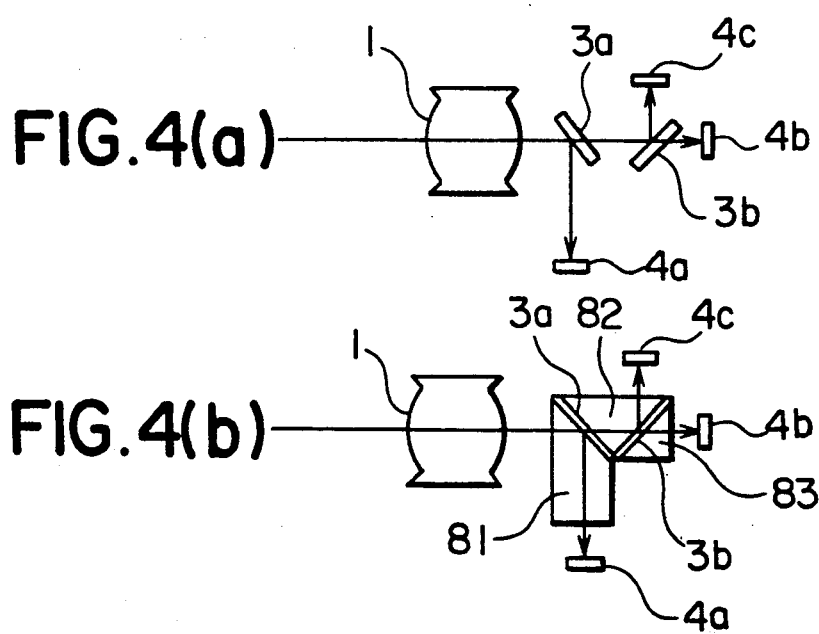
FIG.4(a)
FIG.4(b)

FIG. 5
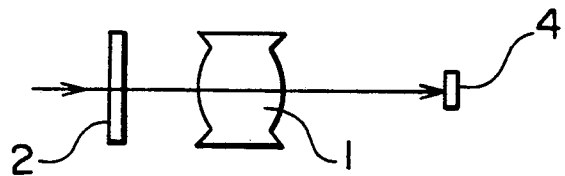
FIG. 6(a)      FIG. 6(b)
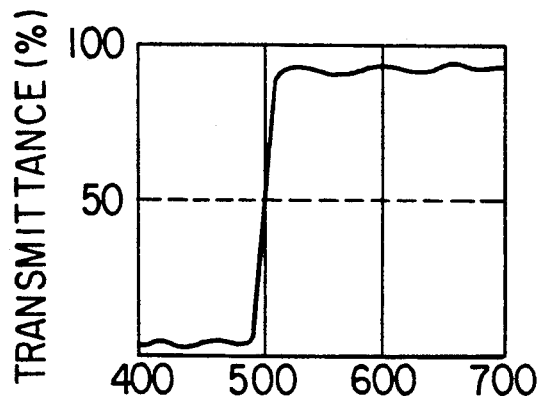 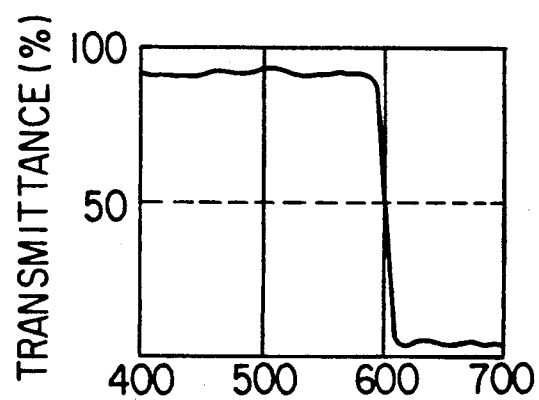
FIG. 7(a)     FIG. 7(b)
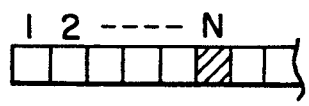 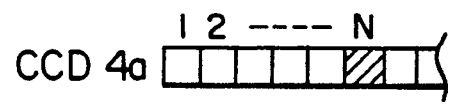
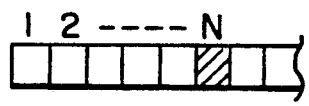 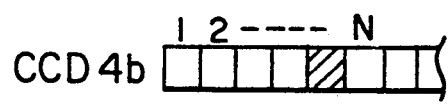
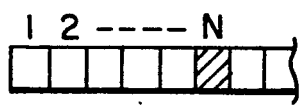 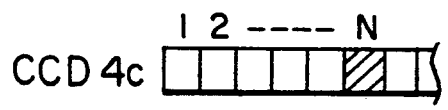

IMAGE READING APPARATUS CAPABLE OF DISCRIMINATING BETWEEN A CHROMATIC AND AN ACHROMATIC PORTION OF AN IMAGE

BACKGROUND OF THE INVENTION

This invention relates to a color image reading apparatus for use in a color copier and the like.

Examples of the conventional color image reading apparatus are illustrated in FIG. 4(a) and FIG. 4(b). In FIG. 4(a), the numeral 1 is an image formation lens, the numerals 3a and 3b are dichroic mirrors, and the numerals 4a, 4b, and 4c are photoelectric transfer elements which are composed of a charge coupled device and the like, wherein the photoelectric transfer elements are arranged in a line. The photoelectric transfer element is called a CCD in the remainder of this specification. A document is irradiated by a light source not illustrated in the drawing and the document image is formed on CCDs 4a, 4b, and 4c by the lens 1. The dichroic mirrors 3a, 3b are interference filters which are composed of dielectric films of low refractive index, dielectric films of high refractive index, and a transparent base board, wherein the dielectric films of low refractive index and the dielectric films of high refractive index are alternately laid on the transparent base board to form a multilayer by the method of vacuum deposition. The spectral transmittance of the dichroic mirrors 3a, 3b is shown in FIG. 6(a) and FIG. 6(b). For example, when the dichroic mirror 3a has the spectral transmittance characteristics of reflecting blue as illustrated in FIG. 6(a), and when the dichroic mirror 3b has the spectral transmittance of reflecting red as illustrated in FIG. 6(b), CCDs 4a, 4b, and 4c can read out the information of blue, green, and red, respectively. The dichroic mirrors 4a, 4b, and 4c are placed at their respective positions so that the distance between the lens 1 and CCD 4a, the distance between the lens 1 and CCD 4b, and the distance between the lens 1 and CCD 4c are equal.

In the example illustrated in FIG. 4(b), the dichroic mirrors 3a, 3b and CCDs 4a, 4b, 4c are disposed in the same way as the example illustrated in FIG. 4(a). However, prisms 81, 82, 83 are used in the example and the dichroic mirrors 3a, 3b are provided for the surfaces on which the prisms 81, 82, 83 are adhered to one another. Therefore, a ray of light enters and exits vertically with regard to the glass surface of the dichroic mirror. As a result, the occurrence of astigmatism can be prevented.

The example illustrated in FIG. 5 has a simple composition in order to obtain the information of blue (B), green (G), and red (R) components. Only one photoelectric transfer element 4 is provided, and three filters 2 are provided which can be alternately inserted in front of the lens 1, wherein the three filters 2 are defined as follows: the filter through which a blue (B) component can be transmitted; the one through which a green (G) component can be transmitted; and the one through which a red (R) component can be transmitted.

The problems to be solved can be explained as follows.

In the color image reading apparatus illustrated in FIG. 4(a) and 4(b), the composition is complicated, and furthermore incorrect color information will be obtained unless the readout image correctly corresponds to three CCDs 4a, 4b, 4c within the range of one pixel size (usually 7 μm□ to 14 μm□. For that reason, the photoelectric transfer elements CCDs 4a, 4b, and 4c must be very precisely positioned. To go into more detail, an example will be described as follows. In the example, the size of a black spot on a document is equal to that of one pixel of CCDs 4a, 4b, and 4c. When the black spot image is correctly projected onto pixel N of CCDs 4a, 4b, 4c (FIG. 7(a)), the output of blue, green, and red information become zero and the color of the image is determined to be black. On the other hand, when CCDs 4a, 4b, 4c are not positioned correctly as illustrated in FIG. 7(b), signal N is determined to be green.

As explained above, when the positions of CCDs 4a, 4b, 4c are adjusted, an accuracy of the order of several μm is required. Other than that, the angles of CCDs 4a, 4b, 4c to each optical axis must be adjusted. Consequently, there are problems such as many working hours needed for assembly and an increase in the cost of production.

Furthermore, there is another problem which will be described as follows. Since the discrimination between a chromatic color and an achromatic color is determined only by the information of B, G, and R, an achromatic portion made by Y, M, and C ink can not be correctly discriminated from an achromatic portion made by black ink, so that an achromatic portion such as a black letter and a gray portion can not be reproduced properly.

The composition of the color image reading apparatus illustrated in FIG. 5 is simple and the cost of production of the apparatus is low. However, the apparatus stores the data into the memory according to only the information of B, G, and R in order to discriminate an achromatic color in the same way as the color image reading apparatus illustrated in FIG. 4(a) and 4(b). For that reason, a large memory capacity is necessary to discriminate an achromatic portion and it takes time to read an image and furthermore color image reproduction is incorrect.

It is an object of the present invention to provide an improved color image reading apparatus which can solve the above-described problems, and which can correctly discriminate between an achromatic color and a chromatic color by a simple composition.

SUMMARY OF THE INVENTION

The above-described object of the invention can be attained by a color image reading apparatus characterized in that a solid-state image sensor is provided which separates a document image into a visible light component and an infrared component, and image data is obtained by the solid-state image sensor: A color image reading apparatus in which a color separation means, which separates the image data into a visible and an infrared components, is provided, in an image formation optical path to form an image by a lens, in order to divide the optical path into two; a solid-state image sensor is provided for each of the image formation surfaces and color discrimination data to discriminate the color of document image can be obtained from image data obtained by the two solid-state image sensors: And a color image reading apparatus in which filters, which transmit infrared rays and one of blue, green, or red lights, are alternately inserted before the above-described color discrimination means in the optical path; color image reproduction data is composed of both color separation image data in the color image of blue, green or red light obtained by the filters, and the above-described color discrimination data.

The colored portion of a document is printed by printing ink or toner of yellow (Y), magenta (M), and cyan (C). As illustrated in FIG. 8, the spectral reflectance peculiar to a color is represented in the visible region. However, every color shows high reflectivity in the infrared region. On the other hand, as shown by a broken line in FIG. 8, black printing ink or black toner made from carbon black shows low reflectivity over the total wavelength and the reflectivity curve is flat.

The present invention is intended to discriminate between a chromatic color and an achromatic color utilizing the difference in reflectivity. For example, color discrimination can be described as follows.

(1) A dichroic mirror which separates a color image into visible light and infrared light is provided in the optical path of the color image reading apparatus. Discrimination between a chromatic color and an achromatic color and between two types of achromatic color can be correctly conducted by comparing the reflectivity of visible light with that of infrared light, which are output from CCDs provided at the image formation surfaces of the two optical paths.

(2) Discrimination between a chromatic color and an achromatic color and between two types of the latter can be correctly conducted by providing two parallel CCDs sensitive to the visible light region and the infrared light region, respectively, and comparing the reflectivity of visible light with that of infrared light.

BRIEF DESCRIPTION OF THE DRAWINGS

FIG. 3 is a graph which illustrates regions utilized in discriminating between an achromatic color and a chromatic color according to the output of CCD 4 and CCD 5.

FIG. 4(a), FIG. 4(b), and FIG. 5 are sectional views of a conventional color image reading apparatus.

FIG. 6(a) and FIG. 6(b) are graphs which illustrate the spectral transmittance of a conventional dichroic mirror.

FIG. 7(a) and FIG. 7(b) are drawings which illustrate the image projected on a pixel of each CCD.

DETAILED DESCRIPTION OF THE INVENTION

Figure 1A:
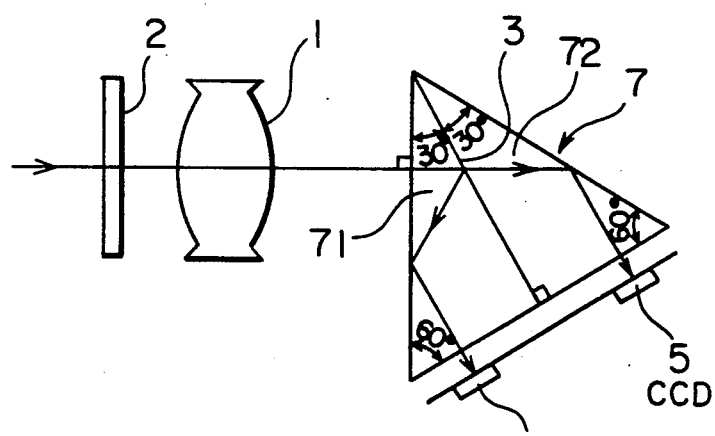
FIG. 1(a) and FIG. 1(b) are sectional views which illustrate an example of the present invention.
Figure 2:
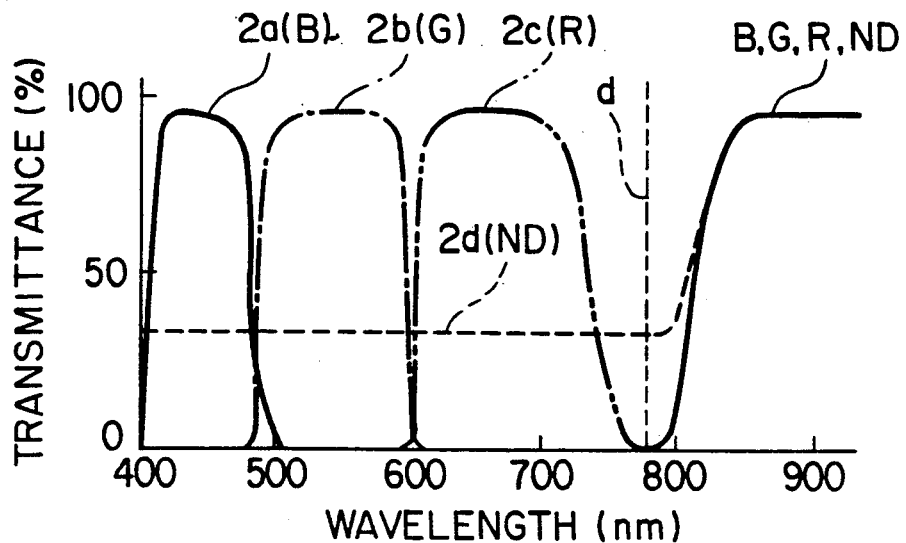
FIG. 2 is a graph which illustrates the spectral transmittance of the color filter in FIG. 1.
Figure 8:
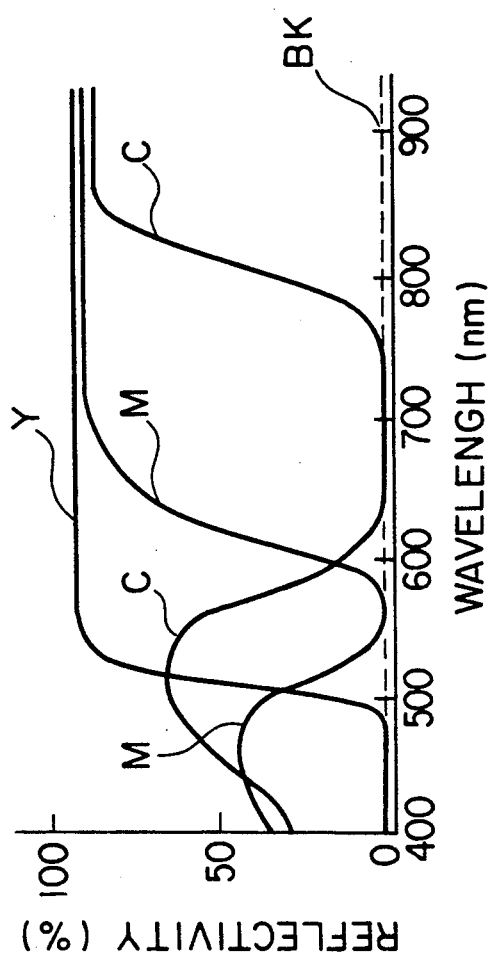
FIG. 8 is a graph which illustrates the spectral reflectance of Y, M, C, and BK images formed by printing ink or toner used for a copier.

Referring to the drawings, an example of the present will be explained as follows. FIG. 1(a) is a sectional view which illustrates an example of the present invention. FIG. 2 is a graph which illustrates the spectral transmittance of the color filter 2 in FIG. 1(a).

In FIG. 1(a), the numeral 2 is a color filter which is inserted on the document side of the lens 1 in the optical path. The numeral 7 is a color separation prism of a color separation means. The numerals 4 and 5 are CCDs which are photoelectric transfer elements arranged in a line, and which are sensitive to a range of light from visual light to infrared light. The color separation prism 7 is composed of two prisms 71, and 72, wherein one angle of each prism is 30 degrees and another angle is 60 degrees, and the dichroic mirror 3 is provided between the two prisms joining together. As shown in FIG. 1(a), after the incident light from the lens 1 is separated into visible light and infrared light at the dichroic mirror surface 3, the light is reflected by the side surfaces of the prisms 71, 72 and goes out vertically from the bottom of the color separation prism 7 to form an image on CCD 4 and CCD 5 which are placed on a common surface.

The color filters 2, the spectral transmittance of which is illustrated in FIG. 2 are inserted into the optical path in the manner described as follows. The blue (B) filter 2a is inserted into the optical path in accordance with the development of yellow (Y). The green (G) filter 2b is inserted into the optical path in accordance with the development of magenta (M). The red (R) filter 2c is inserted into the optical path in accordance with the development of cyan (C). ND filter 2d is inserted into the optical path in accordance with the development of black (BK). All the color filters 2 must have the characteristic of transmitting infrared light. The characteristics can be obtained by using a film type of filter in which dyes are utilized. When precise characteristics are required, the dichroic mirror may be used together with the film type filter.

Figure 1B:
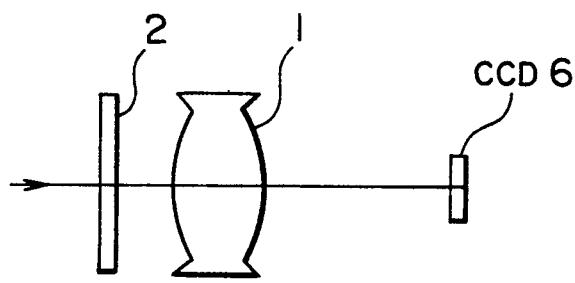

FIG. 1(b) shows an example in which CCD 6 is used, wherein CCD 6 is made in such a manner that two lines of CCDs are disposed on one tip in parallel. A filter which transmits only visible light and a filter which transmits only infrared light are provided on each line of the pixels, wherein the characteristics of the filters correspond to the separated wavelength of the dichroic mirror in FIG. 1(a). Since the example has such a composition as explained above, it performs an equivalent function to the color separation prisms shown in FIG. 1(a).

The letter d in FIG. 2 represents the separation wavelength of the color separation means. Taking consideration of the characteristics of printing ink and toner used at present, it is preferable that the separation wavelength is approximately 800 nm.

An example has been shown in which the color separation prism 7 is used as the color separation means. However, the invention is not limited to the specific example. For instance, when attention is not directed to astigmatism, a dichroic mirror composed of a glass plate, the surfaces of which are in parallel, may be used as the color separation means. The filter 2 is not necessarily placed before the lens 1 but may be placed after the lens 1. An image by visible light is formed on CCD 4 and an image by infrared light is formed on CCD 5 by the composition described above. To go into more detail, an image by B, G, R, and all visible light range can be formed according to the kind of filter inserted into CCD 4. ND filter 2d is inserted in order to balance the output of CCD 4 and that of CCD 5 when the image by visible light in the total range is formed on CCD 4. It is preferable to adjust the output of each CCD and conduct shading correction according to a white board every time readout-scanning is conducted.

Discrimination between a chromatic color and an achromatic color of a document color image will be described as follows.

In the case the blue (B) filter 2a is inserted, the output of CCD 4 is increased (it becomes bright) for the magenta (M) portion and the cyan (C) portion of the document, and the output of CCD 4 is decreased (it becomes dark) for the yellow (Y) portion of the document. On the other hand, when the document color is chromatic, the output of CCD 5 is increased (it becomes bright) for every color as infrared light is reflected.

As for the achromatic color portion of a document printed by black (BK) ink or toner, the output of CCD 4 and that of CCD 5 become approximately equal according to the density, wherein the output has no relation with the color of the filter 2 inserted. In other words, when the document color is chromatic or achromatic, wherein the achromatic color is made from ink or toner of Y, M, and C, the output of CCD 4 varies according to the color and the kind of filter 2, but the output of CCD 5 is large for every color.

When the document color is achromatic, more particularly, when the document color is such an achromatic color that its reflectivity is low even in the infrared region in the same manner as carbon black, both the output of CCD 4 and that of CCD 5 vary according to the document density. However, both of them are nearly equal. When this phenomenon is represented by a coordinate system in which the vertical line represents the output of CCD 4 and the horizontal line represents the output of CCD 5 as shown in FIG. 3, the region determined by the output of CCD 4 and that of CCD 5, is represented by the region A which is located in the vicinity of the diagonal line. In FIG. 3, the numeral a1 represents the position of black with high density, the numeral a2 represents the position of gray with low density, and the region $A_0$ represents the output of the white portion. In the case of a chromatic color, the region is located at the region B in FIG. 3. In this way color discrimination data can be obtained. In FIG. 3, the letters Y, M, and C represent the output characteristics of the document color Y, M, and C when the blue (B) filter 2a is used. The black portion of a document composed of Y, M, and C is discriminated as a chromatic color.

When the developing order by color toner is Y→M→C→BK, the order of the color filters 2 inserted into the optical path is B filter 2a→G filter 2b→R filter 2c→ND filter 2d. According to the color discrimination described above, the toner image formation of Y, M, and C is conducted only for the chromatic portion and the toner image formation of BK is conducted for the achromatic portion. Under-color-removal of 100% can be conducted in the manner described above. An optional under-color-removal, for example, 30 to 70% under-color-removal, can also be conducted. In this way, the purely achromatic portion can be correctly reproduced. It is possible that the toner image formation of Y, M, and C is conducted for the achromatic portion (0% under-color-removal), and that the color image formation is adopted by adding black.

Referring to the drawings, the first applied example of the invention will be explained as follows.

Figure 9:
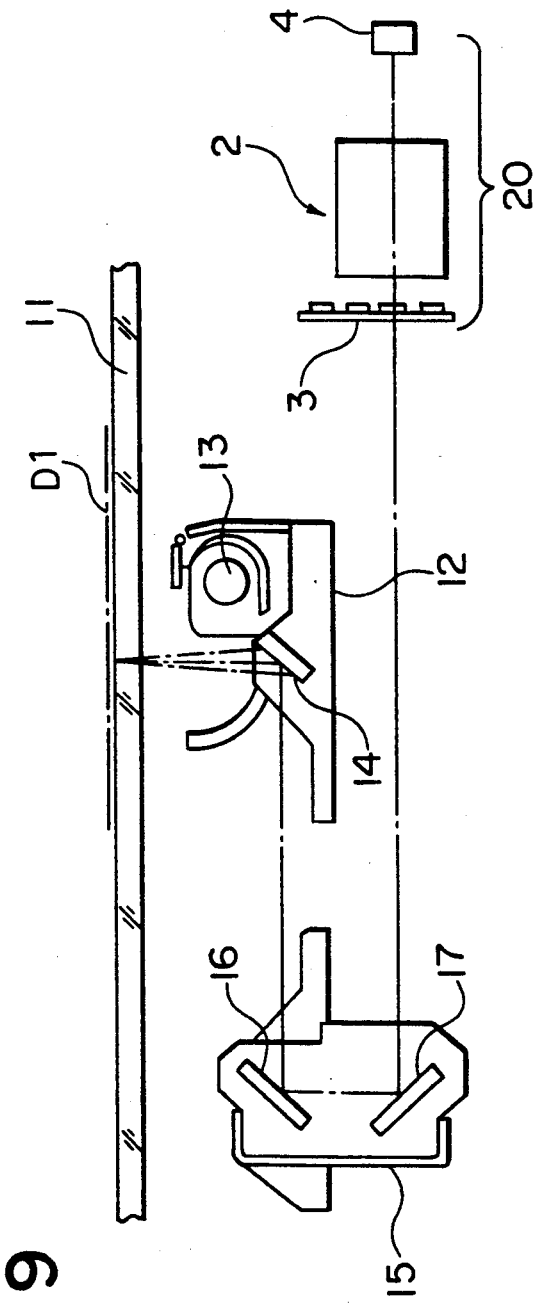
FIG. 9 is a schematic illustration which shows the first example of the present invention.
Figure 10:
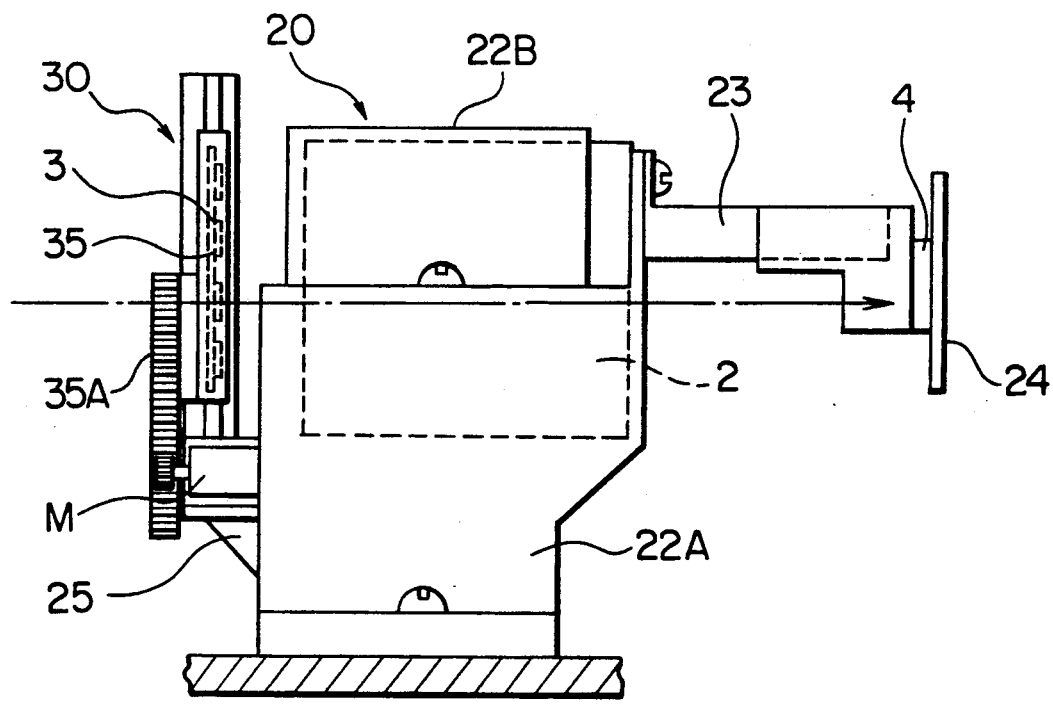
FIG. 10 is an enlarged side view of the image reading unit 20 in FIG. 9.

FIG. 9 is a schematic illustration of the first applied example of the present invention. FIG. 10 is an enlarged side view of the image reading unit 20 illustrated in FIG. 9. In FIG. 9, the numeral 11 is a platen glass. Document D1 put on the platen glass 11 is irradiated by the light source 13 such as a halogen lamp which is mounted on the carriage 12 sliding in the horizontal direction. The mirrors 16, 17 are mounted on the movable mirror unit 15 and the mirror unit 15 slides in the horizontal direction. The mirrors 16, 17 are optically combined with the mirror 14 mounted on the carriage 12 and lead the light reflected by document D1 to the image reading unit 20.

The carriage 12 and the movable mirror unit 15 are driven by a drive unit such as a stepping motor (not shown in the drawing) through a wire rope (not shown in the drawing). The carriage 12 and the movable mirror unit 15 are slid at a speed of V and $\frac{1}{2}$V respectively so that the distance from the surface of document D1 to the lens 2 is kept constant.

The image reading unit 20 is composed of the lens 2, the filter support unit 30, the solid-state image sensor 4, and the like.

The light reflected by document D1 is reflected by the mirrors 14, 16, 17 and transmitted through the filters 31, 32, 33, and 34 which are blue, green, red, and neutral filters used for color discrimination, wherein the filters 31, 32, 33, and 34 compose the filter unit 3 provided to the filter support 30. The filter unit 3 will be described later. After the light has been transmitted through the filters, it is converged by the lens 2 and the image is formed on the light receiving surface of the solid-state image sensor 4 composed of CCDs arranged in a line. Accordingly, when a copy is made by the apparatus, the scanning is conducted 3 or 4 times by the carriage 12 and the movable mirror unit 15, and simultaneously the filter unit 3 is moved in the intervals of scanning so that the filters 31, 32, 33, and 34 are inserted into the optical path in order. (When an image of black component is obtained, scanning is conducted 4 times.)

As explained above, after the image colors on document D1 are separated, the image is formed on the solid-state image sensor 4 and the image signals composed of a blue, green, red, and neutral component are outputted in order from the solid-state image sensor 4. Shading correction, gradation correction, and dither processing are conducted for the image signals being scanned in the signal processing unit at every exposure scanning. Then, the signals are inputted into a color image writing unit.

An example of the image reading unit 20 is illustrated in FIG. 10. The lens 2 is provided to a lens barrel. The lens barrel is set on a V-shaped mount of the support 22A and fastened by the fastening metal fittings 22B to be fixed, wherein the V-shaped mount is formed by two surfaces which meet at right angles with each other and open upwards. The support 22A is mounted on the base board of the color image reading apparatus.

The bracket 25 is provided to the front end surface of the support 22A and the filter support 30 is mounted on the bracket 25. The solid-state image sensor 4 is mounted on the reading base board 24 and fixed to the rear upper end of the support 22A through the fixing member 23, wherein the position of the solid-state image sensor is adjusted.

Figure 11:
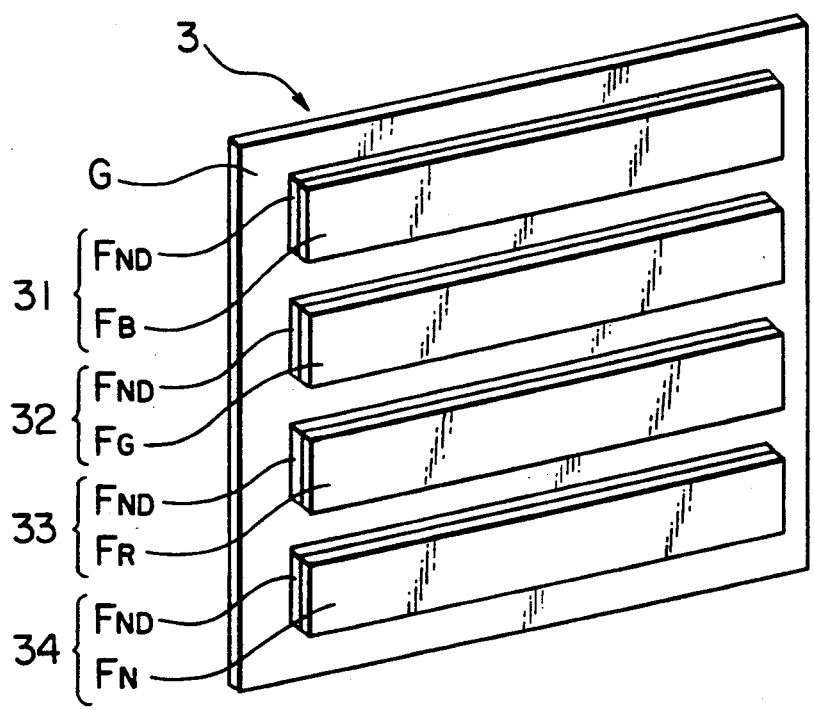
FIG. 11 is an enlarged perspective view of the filter 3 in FIG. 9.

As illustrated in FIG. 11, the filter unit 3 is composed as follows. In order to form the filters 31, 32, 33, 34, the neutral filter FN, the color separation filters FB, FG, FR which have the characteristics of transmittance $2a$(B), $2b$(G), $2c$(R) and $2d$(ND) illustrated in FIG. 2, and the exposure adjusting ND filter FND the details of which will be described later, are laid on the same surface of the transparent glass plate G so that the surfaces are leveled with each other, wherein the glass plate G is a transparent base board. ND filter FND adjusts the output of the solid-state image sensor 4 so that the output of the sensor can be kept approximately constant (the practical sensitivity becomes constant) when the neutral filter FN, the color separation filters FB, FG, and FR are inserted into the optical path. The filters 31, 32, 33, and 34 are placed in parallel with each other in the longitudinal direction and adhered to the glass surface with an adhesive agent such as balsam or the like in order to be integrally fixed.

Accordingly, the surfaces of the filters 31, 32, 33, and 34 are precisely aligned and provided to the filter frame 35 which will be described later. Consequently, even when the filters are replaced, the surfaces of the filters 31, 32, 33, and 34 make a right angle with the optical axis of the lens 2. When the color separation filters FB, FG, and FR, and ND filter FND are interference filters composed of multilayer films of ZnS and MgF$_2$, the endurance of the filters can be improved by using the interference filter surface for adhesion.

Since the filter unit 3 for color separation is formed into a solid body, the structure of the filter frame 35 is simplified. Furthermore, the assembly of the filter unit 3 and the filter frame 35 is simple. The adjustment work of the filter is also simple.

In order to make the practical sensitivity constant, the energy distribution of the light source 13 must be considered and the deviation of the practical sensitivity can be maintained in the range of ±10%. For instance, the above-described ND filter FND is composed of the interference filter and an alloy vapor deposition film so that ND filter FND can have practically flat characteristics of transmittance to visible light, and infrared light wherein the materials of the ND filter FND is selected so that the filter can bear appropriate transmittance.

Figure 12:
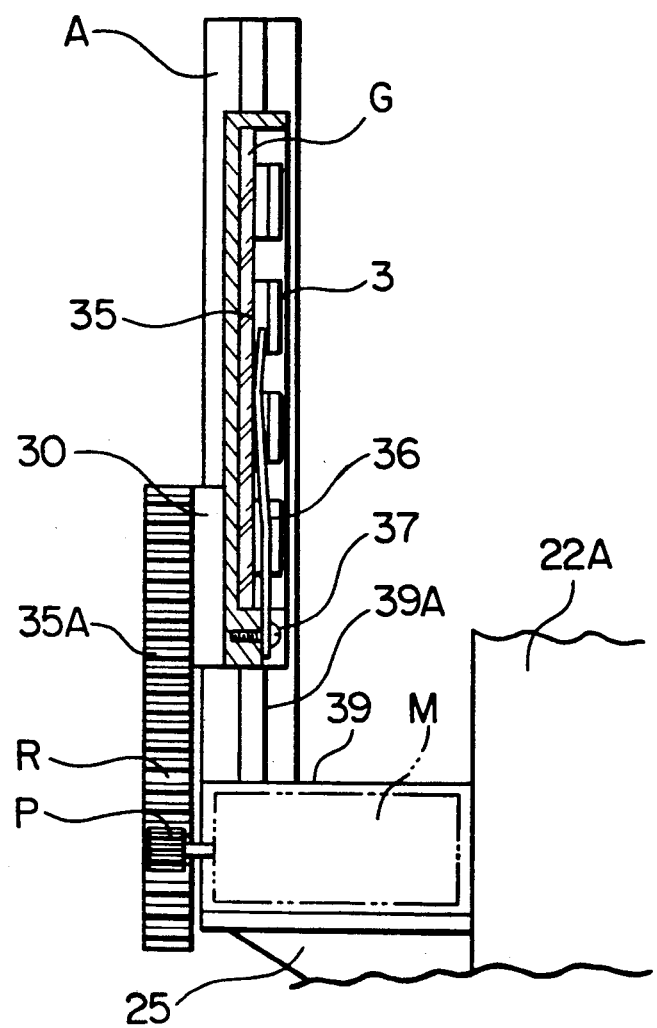
FIG. 12 is a fragmentary sectional view of the filter support 30 in FIG. 10.

The refractive index and the total thickness of the filters 31, 32, 33, and 34 are adjusted to be the same value so that the image formation position is not varied even when any of the filters 31, 32, 33, and 34 is inserted into the optical path. As illustrated in FIG. 12, the filter support 30 is composed of the frame 34, the filter frame 35 which supports the filter unit 3, the support member 39A which is vertically provided to the frame 39, and motor M, such as a servo-motor, which is built into the frame 39. The spring 36 is mounted on both sides of the filter frame 35 being fixed by the screw 37. The right and left side of the transparent glass G of the filter unit 3 is pressed against the filter frame 35 by the spring 36 so as to be fixed to the filter frame 35. Accordingly, the filter unit 3 is positively held so as not to be optically deformed.

The side end surface of the filter frame 35 engages with the support member 39A by a dovetailed groove and a slidable dovetail, for example. The L-shaped arm 53A is provided to the lower end of the filter frame 35 to form rack R. Rack R engages with pinion P which is provided to the rotary shaft of servo-motor M.

Electrical power is intermittently supplied to motor M according to the signal sent from the control unit synchronously with the exposure process of the copier, and the filter frame 35 is moved by motor M to transfer precisely the filters 31, 32, 33, and 34 in order into the optical axis of the lens 2.

When one cycle of the exposure process is completed, the filter 31 is automatically returned to the initial position into the optical axis.

Concerning motor M, it is possible to replace the servo-motor with a pulse motor and precisely transfer the filter frame 35 synchronously with the exposure process according to the pulse controlled by the control unit.

In the example described above, the color separation filter and ND filter are stacked on the transparent glass, which is the base board, and adhered to one another. It can be understood that the following example is also included in the present invention: a filter, which is made in such a manner that the color separation filter and ND filter are stacked and adhered to each other, can be provided to the base board and removed from it if necessary; and this type of filter can be exchanged and adjusted in accordance with the characteristics of the solid-state image sensor.

Referring to the drawings, the second concrete applied example will be explained as follows.

Figure 13:
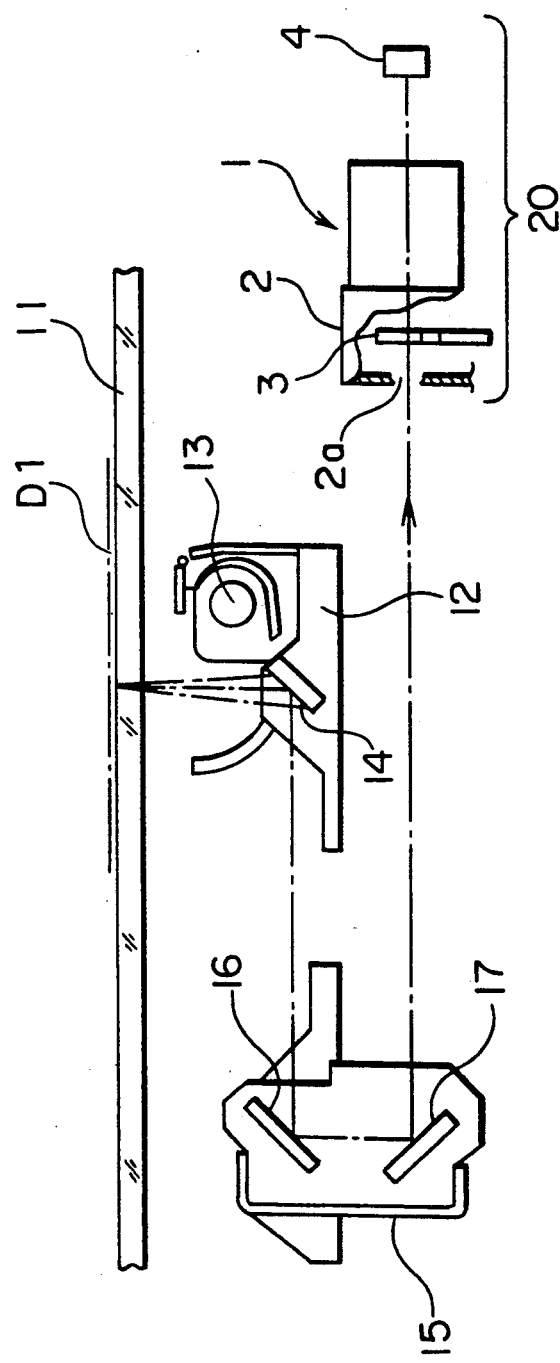
FIG. 13 is a schematic illustration of an example of the present invention.
Figure 14:
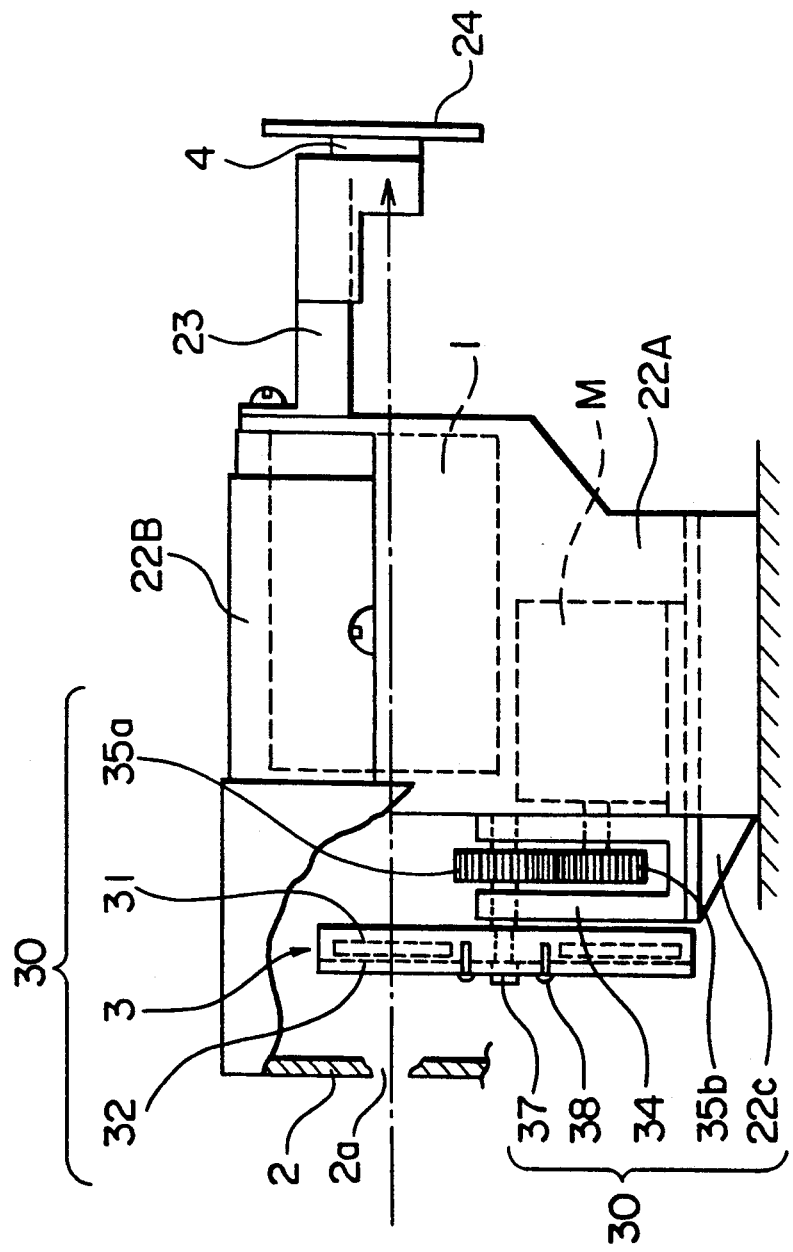
FIG. 14 is an enlarged side view of the image reading unit in FIG. 13.

FIG. 13 is a schematic illustration of the second applied example of the present invention. FIG. 14 is an enlarged side view of the image reading unit 20 shown in FIG. 13. In the drawing, the numeral 11 is a platen glass. Document D1 put on the platen glass 11 is irradiated by the light source 13, such as a halogen lamp, mounted on the carriage 12 which can slide horizontally. The mirrors 16, 17 are provided to the movable mirror unit 15 which can slide horizontally, and the mirror 14 is provided to the carriage 12. Due to the combination of the mirrors 14, 16, and 17, the light reflected by document D1 can be led to the image reading unit 20.

The carriage 12 and the movable mirror unit 15 are driven by a drive unit such as a stepping motor through a wire rope. (Neither the stepping motor nor the wire rope is illustrated in the drawing.) The carriage 12 and the movable mirror unit 15 are slid in the same direction at a speed of V and $\frac{1}{2}$V respectively so that the distance from the document D1 surface to the lens 1 can be kept constant.

The image reading unit 20 is composed of the cover 2 to which the lens 1 and the slit $2a$ are provided, the filter support 30 which supports the filter holder 3, and the solid-state image sensor 4.

The light reflected by document D1 is led by the mirrors 14, 16, and 17, and passes through the slit $2a$. Then the light is transmitted in order through the color separation filters FB, FG, and FR for blue, green, and red which are provided to the filter holder 3. After being transmitted through the filters, the light is converged by the image formation lens 1 on the light receiving surface of the solid-state image sensor 4 which is arranged in a line, to form an image. The document image is inputted into the solid-state image sensor 4 in this way.

Accordingly, when a copy is made, scanning by the carriage 12 and the movable mirror unit 15 is conducted 3 or 4 times and the filter holder 3 is rotated 90° each time synchronously with the scanning so that the filters FB, FG, FR, and FND can be inserted in order into the optical path to read the image optically. Filter FND is used for obtaining a black component image.

In the manner described above, the colors of the document D1 image are separated, and the image signals of a blue, green, and red component and signals of black and white are outputted in order from the solid-state image sensor 4. After shading correction, gradation correction, and dither processing are conducted to the image signals in a signal processing unit, the image signals are inputted into a color image writing unit.

An example of the image reading unit 20 is illustrated in FIG. 14. The lens 1 is provided to a lens barrel. The lens barrel is set on a V-shaped mount of the support 22A and fastened by the metal fasteners 22B, wherein the V-shaped mount is formed by two surfaces which meet at right angles and open upward. The support 22A is mounted on the base board of the color image reading apparatus.

On the front end surface of the support member 22A, there is a cut-out portion in which the bracket 22c and servo-motor M are provided. The frame 34 of the filter support 30 is mounted on the bracket 22C. The solid-state image sensor 4 is mounted on the readout base board 24 and fixed to the rear upper end of the support member 22A through the fixing member 23.

As shown in FIG. 14, the filter support 30 is composed of the filter holder 3, the frame 34 which has a bearing to support the rotary shaft 33 of the filter holder 3, and servo-motor M.

The cover 2 covers the front portion of the filter support 30 and the lens 1. The slit 2a is arranged at the position on the cover 2 through which the optical axis passes, wherein the shape of the slit 2a is a rectangle and the slit is arranged in such a manner that its long side is disposed in the direction vertical to the surface shown in the drawing. The cover shades unnecessary light irradiated from the scanning unit to scan document D1. The scanning of document D1 is conducted in the direction which makes a right angle with the carriage 12 sliding direction. Since a document D image, which makes a right angle with the carriage 12 sliding direction, the length of which is equal to the width of the document D, is formed on the solid-state image sensor 4, unnecessary light is shaded by the slit 2a the shape of which is a rectangle, and the long side of which is disposed in the direction vertical to the surface shown in the drawing. As a result, a fine copy image can be obtained.

Figure 15:
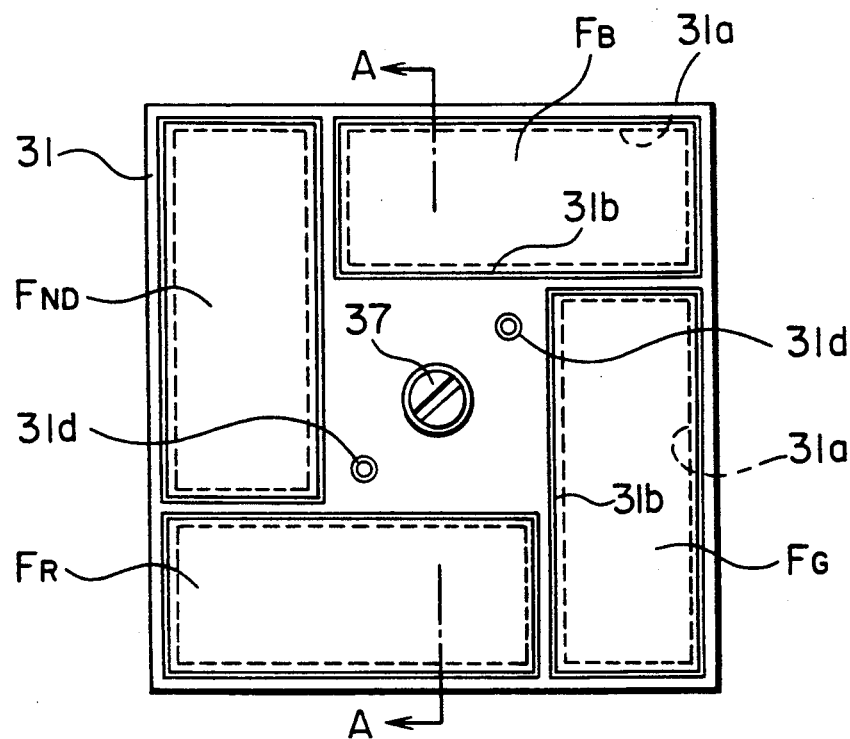
FIG. 15 is an enlarged plan view of the filter holder in FIG. 13.

FIG. 15 is an enlarged plan view of the filter holder illustrated in FIG. 13.

Figure 16:
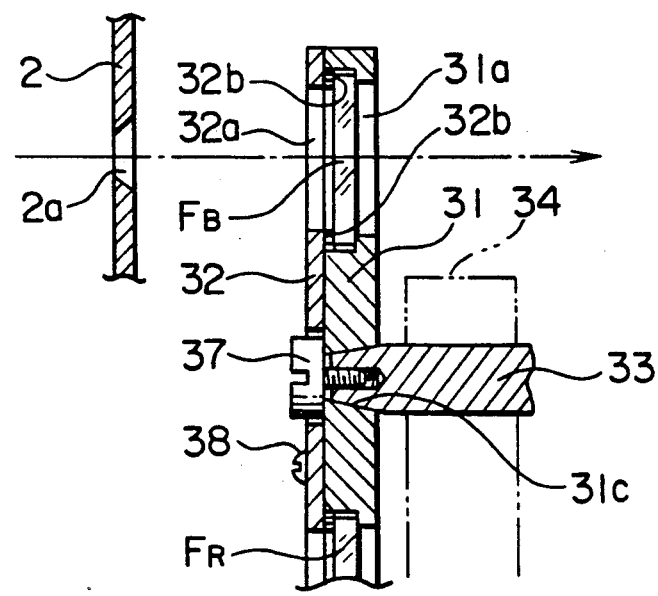
FIG. 16 is a sectional view taken on line A—A of FIG. 15.

FIG. 16 is a sectional view taken on line A—A of FIG. 15. FIG. 15 is also a plan view of the filter holder 3, wherein the presser plate 32 of the filter holder 3 is not illustrated. In the drawings, the numeral 31 is the filter holder to which the following are provided: the cut-out portion 31b in which filters FB, FG, FR, and FND are installed, wherein the cut-out portion 31b is provided in parallel with each side of the filter holder; the opening 31a which is a little smaller than the cut-out portion 31b; the hole 31c which is tapered and provided to the center of the filter holder 3; and the tapped hole 31d. The numeral 32 is a presser plate which has the opening 32a, the size of the opening is equal to that of the opening 31a, and which is fixed to the filter holder 31 by the screw 38 engaging with the tapped screw hole 31d provided to the filter holder 31. The numeral 32b is polystyrene foam packing or the like. The numeral 33 is a rotary shaft the tip of which is tapered, and which engages with the hole 31c provided to the filter holder 31 and is fixed to the filter holder 31 by the screw 37. The rotary shaft 33 is provided with the gear 35a and supported by a bearing (not illustrated in the drawing) mounted on the upper portion of the frame 34. The gear 35a engages with the gear 35b which is provided to the rotary shaft of motor M.

The rotation of the filter holder 3 is stopped at the position where a side of the filter holder 3 becomes parallel with the slit 2a. When the rotation of the filter holder is stopped, the frame 34 is positioned so that the center of each filter, FB, FG, FR, and FND, can be aligned with the optical axis. Even after the filter has been exchanged, the surfaces of the filters FB, FG, FR, and FND can be located vertically to the optical axis of the lens 1.

The color separation filters FB, FG, FR, and ND filter FND are inserted into the cut-out portion 31b of the filter holder 3. The filters are held in such a manner that the edges of the two short sides of the filter or the edges of all sides of the filter are slightly pressed by the presser plate 32 through packing 32b. For that reason, an excessive force is not given to the filters when they are provided to the filter holder 3. As a result, the filters are not deformed and optical deformation does not occur in the image.

The shapes of filters FB, FG, FR, and FND are nearly the same as the slit 2a which is a rectangle. Accordingly, filters FB, FG, FR, and FND can be made compact and the filter holder 3 can also be made compact.

In this example, the same filters as those in the first applied example are used as the color separation filters FB, FG, FR, and FND.

An image reading apparatus of the present invention will be explained as follows.

Figure 17:
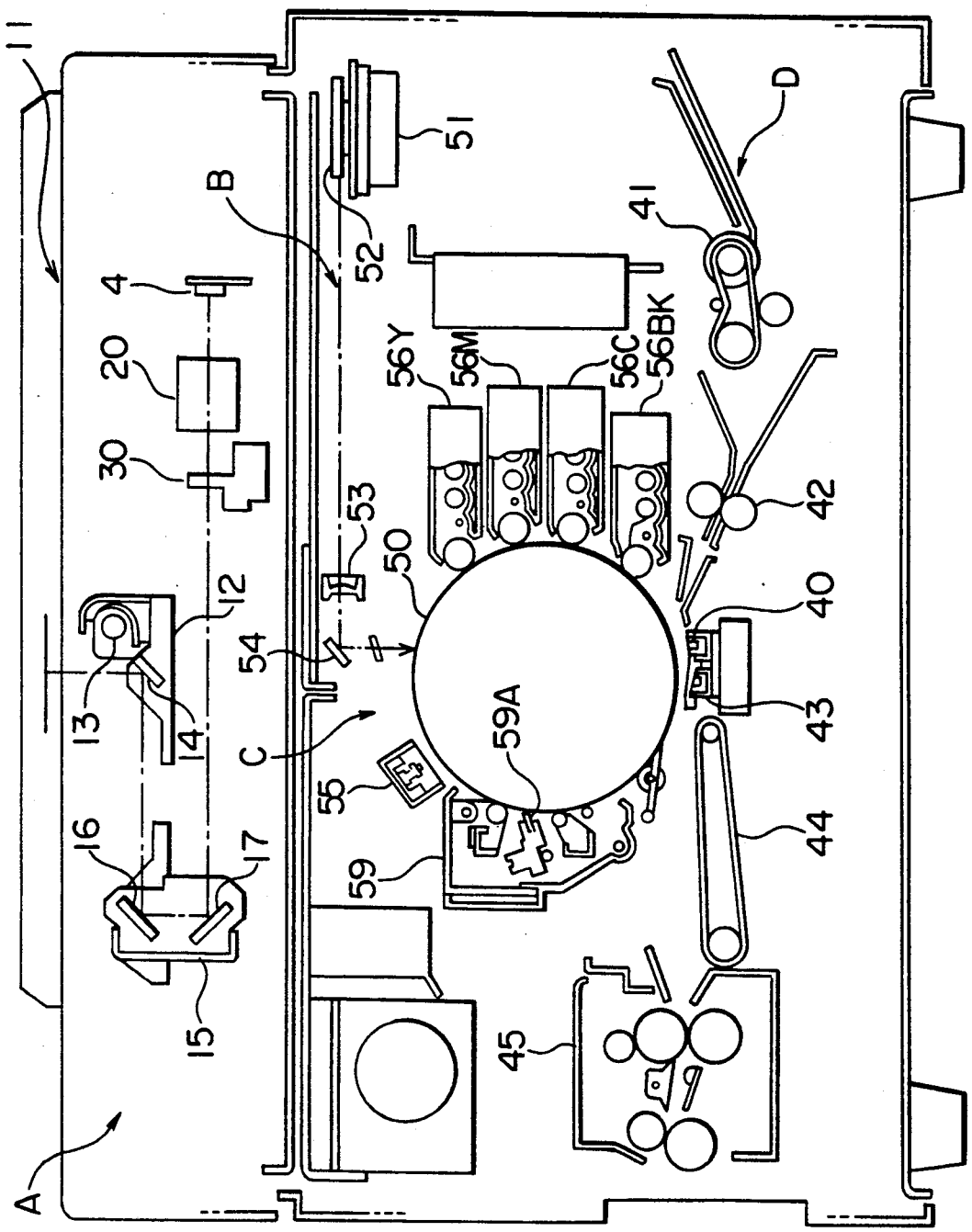
FIG. 17 a schematic illustration which shows the structure of an applied example of the present invention.

FIG. 17 illustrates the main structure of a color image recording apparatus provided with the color image reading apparatus of the present invention. The letter A represents an image reading unit. The letter B represents a laser beam writing unit. The letter C represents an image formation unit. The letter D represents a copy paper feeding unit. A color image is formed according to the following process.

The composition and operation of image reading unit A is as follows as it has already been explained. The exposure scanning of a document put on the platen glass 11, is conducted 4 times by the carriage 12 and the movable mirror unit 15. The color separation filters 31, 32, 33, and 34 are replaced at the filter support unit 30 synchronously with the exposure scanning.

The image signals outputted from CCD 4 corresponding to the blue, green, red, and neutral (ND) filters, are processed in the signal processing unit. Shading correction, gradation correction, and dither processing are conducted in the signal processing unit and the color signals are outputted from the unit in accordance with the color separation filters. The color signals are inputted into the laser writing unit B which is an exposure means.

In the laser beam writing unit B, rotary scanning is conducted by the polygon mirror 52, which is rotated by the driving motor 51, with laser beams generated by a semiconductor laser beam generating unit (not illustrated in the drawing). The laser beams are transmitted through the fΘ lens 53 and the optical path is deflected by the mirror 54. The laser beams are projected onto the circumferential surface of the photoreceptor 50 on which electrical charge is impressed beforehand by the electrical charger 55, and a bright line is formed on the surface of the photoreceptor.

When scanning is started, the laser beams are detected by an index sensor. Then, the beams are modulated by the first color signal, for example, wherein the color signal is transmitted through the blue color separation filter FB. In this way, the modulated beams irradiate the circumferential surface of the photoreceptor 50. Consequently, a latent image is formed on the circumferential surface of the photoreceptor 50 by the main direction irradiation of the laser beams and the auxiliary direction irradiation caused by the rotation of the photoreceptor 50. The latent image is developed by the developing unit 56Y in which yellow toner is loaded and a yellow toner image is formed on the drum surface, wherein the development is noncontact reverse development. The toner image on the drum passes under the cleaning unit 59 which is held away from the circumferential surface of the photoreceptor 50, and goes into the next process.

The photoreceptor 50 is charged again by the electrical charger 55. Then, the second color signal outputted from the signal processing unit, for example an image signal which transmits the green color separation filter FG, is inputted into the writing unit B. The image signals are written on the drum surface in the same manner as the image signals described before. The latent image on the photoreceptor is developed by the developing unit 56M in which magenta toner, the second color toner, is loaded, wherein the development is noncontact reverse development.

The magenta toner image is formed on the photoreceptor without damaging the previously formed yellow toner image.

The numeral 56C is a developing unit in which cyan toner is loaded and the numeral 56BK is a developing unit in which black toner is loaded. The developing units form a cyan and black toner image on the photoreceptor in accordance with the light which transmits the red filter FR and neutral filter FND according to the control signals generated in the signal processing unit. The developing sleeves 56Y to 56K are electrified with D.C bias or D.C and A.C bias and noncontact development by two component developer is conducted. The latent image on the photoreceptor 50 which is earthed, is developed without damaging the previously formed toner image.

The color image formed on the circumferential surface of the photoreceptor 50 is transferred by the transfer pole 40 onto a recording paper conveyed by the paper feeding belt 41 and the paper feeding roller 42. The recording paper onto which a toner image has been transferred is separated from the drum surface by the separation pole 43 and conveyed into the fixing unit 45 by the conveyance belt 44 so that the image on the recording paper can be fixed. After the image has been fixed, the recording paper is delivered from the apparatus.

The blade 59A of the cleaning unit 59 comes into contact with the photoreceptor 50 surface from which the recording paper has been separated, and removes the residual toner. After the residual toner has been removed, the blade 59A is separated again from the circumferential surface of the photoreceptor and the apparatus can begin the next color image forming process.

According to the present invention, it has become possible to provide a color image reading apparatus the characteristics of which can be described as follows. A color separation means which can separate colors into a visible light component and an infrared light component, is provided to the color image reading apparatus. In the color image reading apparatus, B, G, R, and ND filters are inserted into the optical path before color separation is conducted. For that reason, the photoelectric transfer elements, the position of which must be precisely adjusted, become two pieces. Consequently, the structure is simple and assembly and adjustment can be conducted in a short time. The color image reading apparatus can correctly discriminate between an achromatic color and a chromatic color, and reproduce fine colors.

According to the first and second applied examples, a plurality of filters which are composed of color separation filters and exposure adjusting ND filters, are provided into the image reading optical path, wherein the filters can be rapidly exchanged. The above-mentioned ND filters are set so that the practical sensitivity of the solid-state image sensors becomes substantially equal. Consequently, deviation of the characteristics of solid-state image sensors can be adjusted and the output of the sensors becomes substantially equal. Furthermore, the solid-state image sensor can be used within the range in which the relation between the image sensor output and the incident light is linear. Accordingly, image signals with excellent color balance and gradation can be obtained by the color image reading apparatus.

Especially in the second applied example, a cover with a slit is provided in the optical path before the image reading unit and a filter holder is provided in which color separation filters are located, wherein the shape of the filters is similar to the above-mentioned slit. The above-mentioned color filters are inserted into the image reading optical path by the above-described color filter holder which is rotated in order to exchange the color filters. Therefore, unnecessary light can be shaded and the above-described filters composed of interference filters can be made compact. As a result, the cost of the filters can be lowered. Furthermore, the filter holder can be also made compact and the cost can be lowered. Accordingly, it has become possible to provide a compact color image reading apparatus which can be manufactured at low cost and obtain distinct color signals.

What is claimed is:

1. An apparatus for reading a light image representing an original image, the apparatus comprising:
    a first photoelectric means for generating a first electrical signal in response to light from the light image in the visible range;
    a second photoelectric means for generating a second electrical signal in response to light from the light image in the infrared range; and
    means for determining whether a portion of the original image is achromatic and formed from a plurality of chromatic process inks or achromatic and formed from an achromatic process ink on the basis of said first electrical signal and said second electrical signal.

2. The apparatus of claim 1, further comprising means for separating said light image into light in the visible range and light in the infrared range.

3. The apparatus of claim 2, further comprising a filter means, having a plurality of filters, for delimiting the wavelength of said light image so that red, green, and blue image components of the light image are separately supplied to said first photoelectric means and said second photoelectric means.

4. The apparatus of claim 3, wherein said filter means further comprises a filter for delimiting the wavelength of said light image so that an achromatic image component of the light image is supplied to said first photoelectric means and said second photoelectric means.

5. The apparatus of claim 4, further comprising means for scanning a document containing the original image to obtain said light image.

6. The apparatus of claim 3, wherein the plurality of filters includes a light amount adjustment filter so that said red, green, and blue image components are sensed with the same sensitivity by said first photoelectric means and said second photoelectric means.

7. The apparatus of claim 6, wherein said filter means comprises a filter holder means for shifting said plurality of filters so that said red, green, and blue image components are separately supplied to said first photoelectric means and said second photoelectric means, wherein said plurality of filters are each rectangular and positioned in rectangular frames on said filter holder means.

8. The apparatus of claim 6, further comprising means for rotating said filter holder means to shift said plurality of filters.

* * * * *